United States Patent [19]

Ackeret

[11] 3,995,737
[45] Dec. 7, 1976

[54] HOLDERS FOR TAPE CASSETTES

[75] Inventor: Peter Ackeret, Kusnacht, Switzerland

[73] Assignee: IDN Inventions and Development of Novelties AG, Lenzerheide, Switzerland

[22] Filed: May 30, 1975

[21] Appl. No.: 582,117

[30] Foreign Application Priority Data

June 5, 1974 Germany .......................... 2427107

[52] U.S. Cl. ................................ 206/387; 206/804; 221/232; 312/15

[51] Int. Cl.² .................. B65D 85/67; B65D 83/00

[58] Field of Search .......... 206/387, 804, 817, 255, 206/74; 312/13, 15, 10, 12; 221/232, 271, 226, 56, 58, 59, 60, 87; 211/41

[56] References Cited

UNITED STATES PATENTS

| 1,684,188 | 9/1928 | Merrin .................. 221/56 |
| 3,169,660 | 2/1965 | Holzwarth et al. ........... 221/232 |
| 3,239,099 | 3/1966 | Holsombach ............... 221/232 |
| 3,272,325 | 9/1966 | Schoenmakers ............ 206/387 |
| 3,397,818 | 8/1968 | Rey ....................... 221/232 |
| 3,532,211 | 10/1970 | Gellert ................... 206/387 |
| 3,561,004 | 2/1971 | Kozu et al. ............... 206/387 |
| 3,5 8 | 6/1971 | Bian ...................... 312/19 |
| 3,642,337 | 2/1972 | Manheim .................. 312/111 |
| 3,677,396 | 7/1972 | Starr ..................... 312/246 |
| 3,811,745 | 5/1974 | Cylke ..................... 221/87 |
| 3,836,222 | 9/1974 | Kuntze .................... 312/319 |
| 3,866,990 | 2/1975 | McRae ..................... 312/15 |
| 3,899,229 | 8/1975 | Ackeret ................... 312/319 |

FOREIGN PATENTS OR APPLICATIONS

| 32,277 | 12/1967 | Japan | |
| 1,173,273 | 12/1969 | United Kingdom | ............... 312/333 |

Primary Examiner—William T. Dixson, Jr.
Attorney, Agent, or Firm—H. Dale Palmatier

[57] ABSTRACT

A holder for tape cassettes comprising a long, thin, flat housing having one side opening to form an entrance for a tape cartridge cassette to be inserted therein, there being a spring in strip or leaf form arched at the bottom of the housing in engagement with the cassette to thrust the cassette outward through the entrance; one end of the strip being secured adjacent the bottom of the housing, the other end being shaped to form a lock to retain the front corner of the cassette in the housing and being retractable away from the entrance as the strip is arched during ejection of the cassette.

8 Claims, 3 Drawing Figures

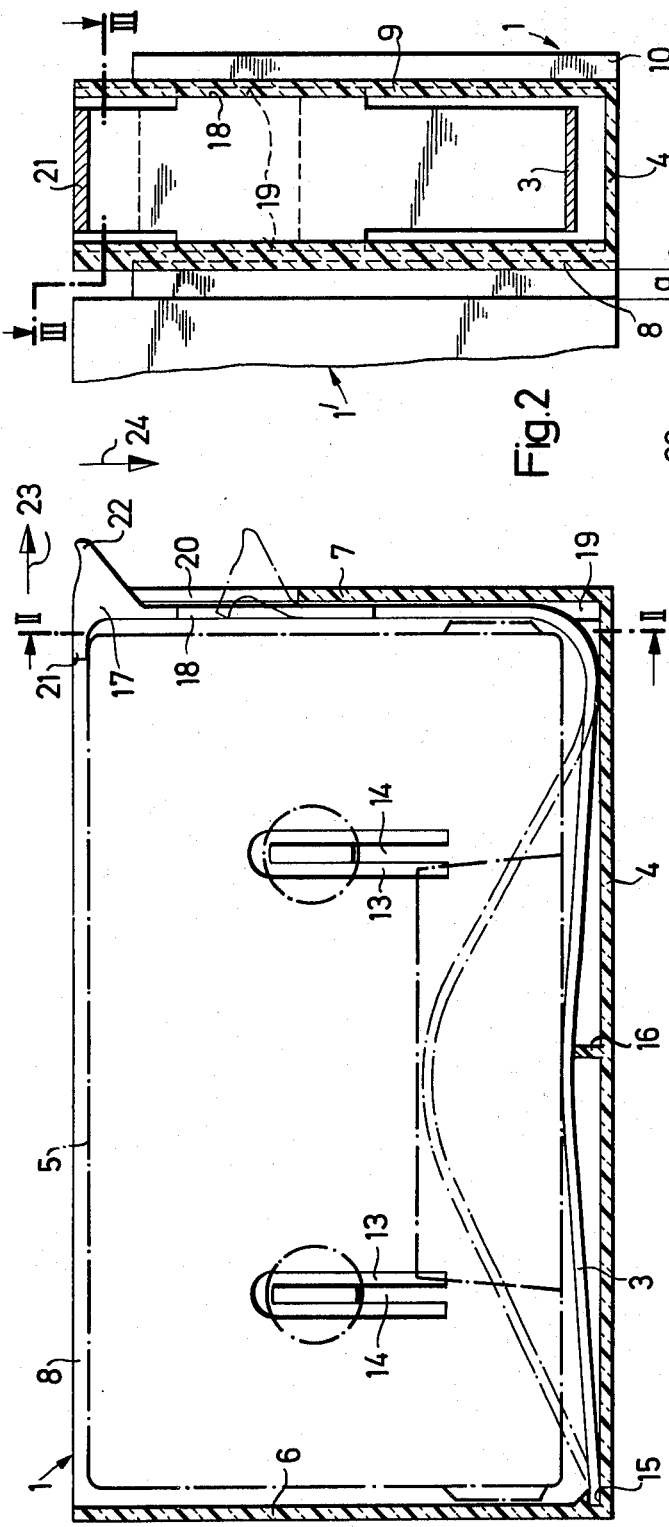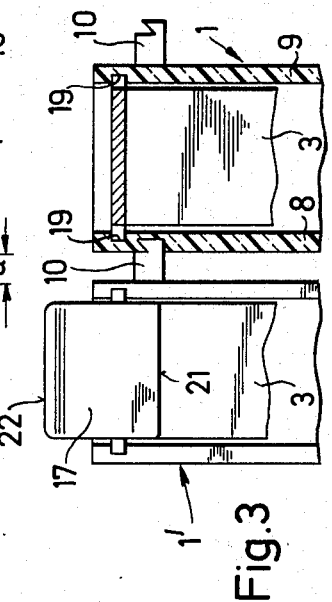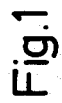

HOLDERS FOR TAPE CASSETTES

The invention relates to holders for tape cassettes, for example a magnetic tape cassette and the like.

Such holders may consist of a housing which encloses the cassette on five of its six sides, and an ejector device which can be actuated in order to push the cassette out in the direction of the housing aperture. In addition to the housing the holder has a type of a drawer which is spring loaded and is locked when the cassette is in the storage position. When the locking means is released, the spring pushes the drawer out and the cassette can be removed. Both the housing and the drawer are of injection-moulded plastic. The holder is provided with means to allow the stacking of several similar holders to form a stack. Furthermore, in the known holder provision is made for the tape coils of the cassette to be fastened by means of cams engaging in the coil cores in the storage position.

The object of the present invention is to create a holder with the features mentioned above and which is particularly economic to manufacture. The holder is of simple construction so that a nett saving on manufacture is produced in comparison with known holders.

This aim is fulfilled according to the invention by providing an ejector device in strip form which extends from one inner housing corner to the opposite one, opposite the housing aperture, and along the adjoining inner side surface, and by pushing the latter band section inwards can be arched in the direction of the housing aperture in the region of the first-mentioned section.

By way of example only an embodiment of the invention will now be described in greater detail with reference to the accompanying drawings of which:

FIG. 1 is a diagrammatic longitudinal section through the holder,

FIG. 2 is a section along line II—II in FIG. 1, and

FIG. 3 is a partial section along the line III—III in FIG. 2.

The holder has a housing 1 with side walls 8, 9, a base 4 opposite the insertion aperture 5 for a cassette and end walls 6, 7. The housing, therefore, substantially forms a box which is open on one narrow side opposite to the base 4.

The side walls 8, 9 are provided with means to allow the stacking of several similar 1,1' holders as shown in FIG. 3. The side wall 9 carries two parallel rails 10 with a dovetail profile on the upper edge, whilst the side wall 8 is provided with grooves corresponding to the dovetail profile. In this way, any two holders which are interlocked are spaced apart by a distance $a$ from one another (FIGS. 2 and 3).

In addition, the side wall 8 has two apertures 13 which are approximately U-shaped when seen in elevation as in FIG. 1, and at the free end of tongues 14 thus formed there is an approximately semi-circular cam projecting into the inside of the housing. The tongues 14 are so positioned that when the cassette 5 is pushed in completely they are flush with the tape coil apertures and secure the tape coil; when the cassette is moved in or out, the tongues 14 can move resiliently away towards the outside. This is also possible when the holders are stacked, due to the spacing $a$. If such fixing is not required, the apertures and tongues are of course omitted, and it is then no longer necessary to maintain a distance $a$. The height of the rails 10 would then be reduced accordingly.

Along the base 4 and the end wall 7 there extends a strip 3 which is attached at 15 and is placed over an inward-extending bridge 16 of the base 4. The free end of the strip has a hook member 17 moulded onto it, and in front of the latter the strip 3 has a widened section 18 which is guided in lateral grooves 19 in the side walls 8, 9 (FIG. 2).

Below the hook member 17 the end wall 7 has a slot 20. The length of the strip 3 is such that the lug extension 21 of the hook member 17 engages over an inserted cassette 5, as shown in FIG. 1.

The housing 1 is a one-piece injection-moulded plastic part, and the strip may be of flexible plastics material or some resilient material for example thin spring steel. In each case the hook member is slightly pretensioned in the direction of the insertion aperture of the container.

When the cassette is in the storage position, as shown in FIG. 1, the strip 3 is stretched and the lug extension 21 holds the cassette 5. In order to remove the cassette it is sufficient to exert a slight pressure on a lateral key 22 formed on the hook member 17 in the direction of the arrow 23, and a shifting movement in the direction of the arrow 24 causes a deformation of the strip 3 such that it is arched away from the base 4 — this is indicated by dash-dotted lines in FIG. 1. If resilient material is used for the strip, the latter is preferably pretensioned in the direction of the arching so that the movement according to the arrow 24 occurs automatically. The length of the slot 20 limits the deformation of the strip, the arched section of which pushes out the cassette 5. If the cassette 5 is now pushed back in again, the operations described take place in reverse order.

As will be apparent from the foregoing description of a preferred embodiment, it is possible to construct the housing on the one hand and the strip on the other hand in such a simple manner that the manufacturing costs are extremely low: the housing may easily be made from injection-moulded plastic, and the strip may also be an injection-moulded part (made of easily deformed, possibly rather flexible plastic) or may be cut from thin spring steel. The addition of a key which facilitates handling does not increase the manufacturing costs to any great extent.

What we claim is:

1. A holder for a tape cassette or the like, comprising a six-sided housing which encloses the cassette on five of its six sides and has an entrance on its sixth side, the housing having an inner side surface opposite the entrance and having inner housing corners adjacent the inner side surface, and an ejector device which is actuable in order to eject the cassette in the direction of the entrance, and in which the ejector device is a flexible but stiff strip which extends along said inner side surface and between the inner housing corners adjacent thereto, the strip having an end portion extending from one of the corners toward the entrance, the strip being actuable by pushing the end portion of the strip inwardly and then along the inner side surface from one corner so as to arch the strip toward the entrance and away from the inner side surface.

2. A holder according to claim 1 in which the end portion of the strip which can be pushed is guided in grooves in the housing.

3. A holder according to claim 1 in which the end portion of the strip section which can be pushed in is provided with a finger grip.

4. A holder according to claim 3 in which the finger grip has a locking lug which engages over the edge of an inserted cassette.

5. A holder according to claim 1 in which there is a bridge extending in the direction of the entrance in order to impart a curvature to the strip in advance.

6. A holder according to claim 1 in which the strip is flexibly pretensioned into the arched shape in the direction of ejection of a cassette.

7. A holder according to claim 1 wherein the free end of the strip and the housing being shaped relative to each other to permit said free end to retract from the entrance as the strip arches.

8. A holder for a tape cassette or the like, comprising:
a six-sided housing which encloses the tape cassette on five of its six sides and has an entrance on its sixth side, the housing having an elongate back side therein opposite the entrance, a flexible but stiff ejector strip extending along the elongate back side of the housing and confronting the entrance to bear against the cassette, the strip being anchored adjacent one end of the elongate back side and being endwise slidable adjacent the other end of the elongate back side to arch toward the entrance and thereby propel the cassette outwardly, and manually engageable means affixed to the strip and being movable and endwise slidable with the strip and said means projecting outwardly through the slot in the housing to facilitate producing such endwise sliding for ejecting the cassette.

* * * * *